3,655,752
ISOMERS OF 2,4,6-TRIHALO-N,N,N',N'-TETRAALKYLISOPHTHALAMIDES

James H. Ackerman, Bethlehem, and George M. Laidlaw, East Greenbush, N.Y., assignors to Sterling Drug Inc., New York, N.Y.
No Drawing. Filed June 20, 1969, Ser. No. 835,233
Int. Cl. C07c *103/34*
U.S. Cl. 260—558 A    4 Claims

ABSTRACT OF THE DISCLOSURE

Geometrical isomers of 5-amino-2,4,6-trihalo-N,N,N',N'-tetraalkylisophthalamides are prepared by separation of the isomer mixtures formed either from halogenation of 5 - amino - N,N,N',N' - tetraalkylisophthalamides or by amidation of the corresponding 5-amino-2,4,6-trihaloisophthalic acids. Deamination via diazotization leads to the corresponding compounds lacking the 5-amino group. The products are useful as intermediates for radiopaques and as tranquilizing and fungistatic agents.

---

This invention relates to geometrical isomers of 2,4,6-trihalo-N,N,N',N' - tetraalkylisophthalamides, optionally substituted in the 5-position by an amino group, and having the formula

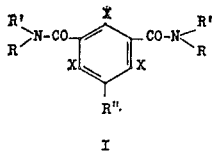

I wherein X is chlorine, bromine or iodine, R and R' are lower-alkyl, and R" is hydrogen or amino.

The invention is based on the discovery of a new type of geometric isomerism. This isomerism is believed due to restricted rotation around the two carbonyl carbon-aromatic carbon bonds caused by the presence of the ortho-halogen atoms. The isomers can be depicted as follows:

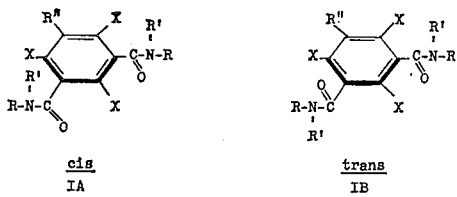

| cis | trans |
| IA  | IB    |

The lower-alkyl groups R and R' can be any lower-alkyl group having from one to four carbon atoms, thus including methyl, ethyl, propyl, isopropyl, butyl, isobutyl, secondary-butyl and tertiary-butyl.

The compounds of Formula I wherein X is bromine or iodine and R" is amino are prepared by the method described in British Pat. 820,661, that is by halogenation of 5-aminoisophthalic acid, conversion of the trihalo derivative to the di-acid chloride and interaction of the latter with a di-lower-alkylamine. The resulting mixture of cis and trans isomers can be separated by fractional crystallization from methanol. There is no disclosure of isomerism in the British patent.

The compounds of Formula I wherein X is chlorine and R" is amino are preferably prepared by an alternative procedure starting from 5-nitroisophthalic acid. The latter is converted to its di-acid chloride and interacted with a di-lower-alkylamine to give an N,N,N',N' - tetra - lower-alkyl-5-nitroisophthalamide. This is catalytically reduced to an N,N,N',N'-tetra-lower-alkyl-5-aminoisophthalamide and then chlorinated with elementary chlorine to give a compound of Formula I where X is Cl and R" is $NH_2$.

The same synthetic scheme can be used to prepare the corresponding bromo and iodo compounds.

The compounds of Formula I where R" is hydrogen are prepared by deamination of the compounds of Formula I where R" is amino. This is accomplished by diazotization followed by reduction with hypophosphorous acid.

The cis-isomer (IA) is a meso compound and the trans-isomer (IB) is a recemic compound (mixture of d- and l-forms). The isomer of I (X is iodine, R" is $NH_2$, R and R' are $CH_3$) of lesser stability, which had the lower Rf value on thin layer chromatography (TLC), was tentatively assigned the cis structure (IA) and this was confirmed by the preparation of the higher Rf isomer (IB) in optically active form. This was accomplished via resolution of the known 5-amino-2,4,6-triiodo-N,N-dimethylisophthalamic acid as the strychnine salt. The two enantiomers of the latter were separated and converted to the free acid. Each enantiomer of the latter was converted to a mixture of the isophthalamides IA and IB by preparation of the acid chloride in thionyl chloride followed by reaction with aqueous dimethylamine, and the isomers were separated by fractional crystallization from methanol. The IA thus obtained was optically inactive whereas the IB was optically active, thus confirming the assignment of cis and trans, respectively, to these isomers.

Biological evaluation of the compounds of the invention has shown that they possess tranquilizing properties. Oral administration to mice at a dose level of 256 mg./kg. caused a significant decrease in the overt activity of the mice as compared to control animals receiving no medication, thus indicating the usefulness of the compounds as tranquilizers. No toxic effects were observed at this dose level.

The compounds of the invention were also found to have fungistatic activity in vitro, for example against *T. mentagrophytes* at concentrations of about 200 micrograms per milliliter. The compounds can be prepared for use by dissolving them in aqueous medium containing a solubilizing agent such as dimethylsulfoxide for topical application in order to disinfect surfaces.

The compounds of Formula I where X is iodine and R" is amino are also useful as intermediates for radiopaque substances. For example, they can be interacted with succinic or glutaric anhydride to form a cyclic imide and the latter hydrolyzed to form the corresponding anilic acid useful as cholecystographic agent.

The following examples will further illustrate the invention which is to be limited only by the scope of the appended claims.

EXAMPLE 1

Cis- and trans-5-amino-2,4,6-triiodo-N,N,N',N'-tetramethylisophthalamide [I; R and R' are $CH_3$, R" is $NH_2$, X is iodine].—A mixture of 66.80 g. of 5-amino-2,4,6-triiodoisophthalic acid (prepared by iodination of 5-aminoisophthalic acid with sodium iododichloride) and 200 ml. of thionyl chloride was heated with stirring on a hot water bath (75° C.) for 30 minutes. The excess thionyl chloride was removed by concentration in vacuo, and by adding benzene and evaporating the solvent. To the residue was slowly added 200 ml. of dimethylamine (40% in water), followed by a mixture of 66 ml. of 35% aqueous sodium hydroxide and 60 ml. of water. The reaction mixture was stirred for 80 minutes and the solid product (61.80 g.) was collected. A small sample of the product was dissolved in about twenty times its weight of methanol. The solution was concentrated to about a third of its original volume. Crystals of the two isomers were allowed to grow slowly from the solution upon cooling. The crystalline forms of the two isomers were distinctly different from one another. They were separated by hand and recrystallized to obtain isomerically pure seed crystals. The total crude product was then separated into its isomers by fractional crystallization from methanol, seeding first with the less soluble isomer, collecting the product, and then seeding with the more soluble isomer and collecting the product. The filtrates were further concentrated and the process repeated. Crops of the same isomer were combined for a final recrystallization from methanol. In this manner there were obtained cis-5-amino-2,4,6-triiodo-N,N,N',N'-tetramethylisophthalamide, M.P. 257–265° C. (the less soluble isomer) and trans-5-amino-2,4,6-triiodo-N,N,N',N'-tetramethylisophthalamide, M.P. 241–258° C. The cis and trans isomers had essentially identical ultraviolet spectra, had similar infrared and N.M.R. spectra, and showed single different spots (Rƒ 0.62 and 0.67, respectively) with thin layer chromatography done on precoated plates (10:20:70 acetic acid:methanol:benzene system). The properties of each compound are compatible with the assigned structure and each gave a mixture of the two components when it was heated at 100° C. in dioxane for sixteen hours. The ratio of isomers (cis/trans) was about 1:5 after heating.

Cis-5-amino-2,4,6-triiodo N,N,N',N' - tetramethylisophthalamide and trans-5-amino-2,4,6-triiodo - N,N,N',N'-tetramethylisophthalamide were interacted with glutaric anhydride in the presence of sulfuric acid at 100° C. to afford, respectively, cis-5-glutarimido-2,4,6-triiodo-N,N,N',N'-tetramethylisophthalamide, M.P. 315–321° C. (fine colorless needles from methanol), and trans-5-glutarimido-2,4,6-triiodo-N,N,N',N'-tetramethylisophthalamide, M.P. 329–335° C. (fine colorless needles from methanol). The latter compounds were hydrolyzed with dilute sodium hydroxide to yield, respectively, cis-3',5'-bis-(dimethylcarbamoyl)-2',4',6'-triisodoglutaranilic acid, M.P. 277–281° C. (colorless solid from methanol) and trans-3',5'-bis-dimethylcarbamoyl)-2',4',6' - triiodoglutaranilic acid M.P. 274–275° C., which are useful as cholecystographic agents.

EXAMPLE 2

(a) Resolution of 5-amino-2,4,6-triiodo-N,N-dimethylisophthalamic acid.—A solution prepared from 109.0 g. of 5-amino-2,4,6-triiodo-N,N-dimethylisophthalamic acid (M.P. 275–280° C.) [Hoey et al., J. Med. Chem. 6, 24 (1963)] and 62.0 g. of strychnine in 3.0 liters of ethanol was concentrated to a volume of 2.75 liters. The solution was seeded with the less soluble salt enantiomer obtained from an earlier small scale run. In this way one enantiomer was obtained pure as the strychnine salt ($[\alpha]_D^{25} = -24.2°$ in dimethylformamide, M.P. 218–221°) and was converted to the free acid by acidification to yield dextro-rotary 5-amino-2,4,6-triiodo - N,N - dimethylisophthalamic acid ($[\alpha]_D^{25} = +13.0°$ in dimethylformamide, M.P. 252–261°, dec.). The other enantiomer was obtained by fractional crystallization from methanol of the acid recovered from the salt residue and consisted of levo-rotatory 5-amino-2,4,6-triiodo-N,N - dimethylisophthalamic acid ($[\alpha]_D^{25} = -12.3°$ in dimethylformamide, M.P. 252–260° C., dec.).

(b) cis-5-amino-2,4,6-triiodo-N,N,N',N' - tetramethylisophthalamide and optically active trans-5-amino-2,4,6-triiodo-N,N,N'N' - tetramethylisophthalamide.—According to the procedure of Example 1, levo-rotatory 5-amino-2,4,6-triiodo-N,N-dimethylisophthalamide acid was converted to its acid chloride with thionyl chloride and the acid chloride converted to the dimethylamide with dimethylamine. Thin layer chromatography showed that the cis and trans isomers were formed in about equal amounts, and these were separated by fractional crystallization from methanol into cis-5-amino-2,4,6-triiodo-N,N,N',N' - tetramethylisophthalamide ($[\alpha]_D^{25} = 0°$ in dimethylformamide, M.P. 257–265° C.) and levo-rotatory trans-5-amino-2,4,6-triiodo-N,N,N',N'-tetramethylisophthalamide $$[\alpha]_D^{25} = -22.2°$$

in dimethylformamide, M.P. 243–264° C.).

Similarly, the dextro-rotatory 5-amino-2,4,6-triiodo-N,N-dimethylisophthalamic acid was converted to cis-5-amino-2,4,6-triiodo-N,N,N',N'-tetramethylisophthalamide and dextro-rotatary trans-5-amino-2,4,6-triiodo-N,N,N'N'-tetramethylisophthalamide ($[\alpha]_D^{25} = +21.2°$ in dimethylformamide, M.P. 243–250° C.).

EXAMPLE 3

(a) 5 - amino-2,4,6-tribromoisophthalic acid.—To a stirred and cooled suspension of 182 g. of 5 - aminoisophthalic acid hydrochloride in 1 liter of water was added dropwise 125 ml. of bromine. The mixture was stirred for about sixteen hours and an additional 43 ml. of bromine was added dropwise. The mixture was stirred for three hours, then cooled in an ice-bath and sodium bisulfite added to destroy the excess bromine. The solid product was collected and recrystallized from acetic acid to give 5-amino-2,4,6-tribromoisophthalic acid, M.P. above 310° C.

(b) Cis- and trans - 5 - amino - 2,4,6 - tribromo-N,N,N',N'-tetramethylisophthalamide [I; R and R' are $CH_3$, R" is $NH_2$, X is Br] was prepared from 195 g. of 5-amino-2,4,6 - tribromoisophthalic acid by converting it to the acid chloride and interacting the latter with dimethylamine according to the procedure of Example 1. There was obtained 165 g. of product comprising a mixture of the isomers, 3.4 g. of which was dissolved in 50 ml. of methanol and the solution concentrated to a volume of 15 ml. The solution was allowed to stand and crystals of both isomers formed which were separated by hand and, after one recrystallization, used to seed the solutions during the fractional recrystallization of the entire product. Said fractional recrystallization was carried out by dissolving the isomer mixture in 400 ml. of methanol, concentrating the solution to a volume of 225 ml. and seeding it successively with each pure isomer. Several crops of each isomer were obtained by further concentration of the mother liquors. The combined crops of each isomer were recrystallized to give cis - 5 - amino-2,4,6-tribromo-N,N,N',N' - tetramethylisophthalamide, M.P. 239–243° C., and trans - 5 - amino - 2,4,6 - tribromo-N,N,N',N' - tetramethylisophthalamide, M.P. 235–239° C. The cis and trans designations were assigned on the basis of analogy with the properties of the corresponding triiodo compounds, in particular from their behavior on thin layer chromatography.

By replacing the dimethylamine in the foregoing preparation by a molar equivalent amount of diethylamine, methylethylamine, diisopropylamine or dibutylamine, there can be obtained, respectively, the cis and trans isomers of 5 - amino - 2,4,6 - tribromo-N,N,N',N'-tetraethylisophthalamide [I; R and R' are $C_2H_5$, R" is $NH_2$, X is Br], 5 - amino - 2,4,6 - tribromo-N,N'-dimethyl-N,N'-diethylisophthalamide [I; R is $CH_3$, R' is $C_2H_5$, R" is $NH_2$, X is Br], 5 - amino - 2,4,6-tribromo-N,N,N',N'-tetraisopropylisophthalamide [I; R and R' are $CH(CH_3)_2$, R" is $NH_2$, X is Br], or 5 - amino - 2,4,6-tribromo - N,N,N',N' - tetrabutylisophthalamide [I; R and R' are $C_4H_9$, R" is $NH_2$, X is Br].

EXAMPLE 4

(a) 5 - nitro - N,N,N',N'-tetramethylisophthalamide.—Anhydrous dimethylamine was passed through a solution of 60 g. of the acid chloride of 5-nitroisophthalic acid (M.P. 61–64° C.) in 500 ml. of dry benzene while the temperature was kept below 40° C. by means of an ice bath. The reaction was complete after about 150 minutes. The reaction mixture was filtered and the filtrate concentrated to remove the solvent, thus affording 58.2 g. of 5 - nitro-N,N,N',N'-tetramethylisophthalamide, M.P. 103–106° C.

(b) 5 - amino - N,N,N',N'-tetramethylisophthalamide was prepared by hydrogenating 55 g. of 5 - nitro-N,N,N',N'-tetramethylisophthalamide in 300 ml. of methanol in the presence of palladium-on-carbon catalyst, and was obtained in the form of colorless needles, M.P. 235–240° C.

(c) Cis- and trans - 5 - amino-2,4,6-trichloro-N,N,N′,N′-tetramethylisophthalamide [I; R and R′ are CH₃, R″ is NH₂, X is Cl].—Chlorine gas was passed for two hours through a solution of 26.2 g. of 5-amino-N,N,N′,N′-tetramethylisophthalamide in 200 ml. of glacial acetic acid with the temperature held below 40° C. The reaction mixture was concentrated to remove the solvent and the residue dissolved in 700 ml. of methanol. The methanol solution was concentrated to a volume of 250 ml. Upon standing there separated 13 g. of trans - 5 - amino - 2,4,6-trichloro-N,N,N′,N′-tetramethylisophthalamide, colorless prisms, M.P. 260–262° C. after a further recrystallization. From the filtrate upon further standing there separated cis-5-amino - 2,4,6 - trichloro-N,N,N′,N′-tetramethylisophthalamide, colorless prisms, M.P. 262–264° C. The cis and trans designations were assigned on the basis of analogy with the properties of the corresponding triiodo compounds, in particular from their behavior on thin layer chromatography.

EXAMPLE 5

Trans - 2,4,6 - tribromo - N,N,N′,N′-tetramethylisophthalamide [I; R and R′ are CH₃, R″ is H, X is Br].—To a suspension of 10.0 g. of trans-5-amino-2,4,6-tribromo - N,N,N′,N′ - tetramethylisophthalamide in 150 ml. of 6 N hydrochloric acid held at −10° C. was added dropwise a solution of 2.0 g. of sodium nitrite in 30 cc. of water, followed by slow addition of 50 ml. of 30% aqueous hypophosphorous acid. The cooling bath was removed and the mixture stirred at room temperature until the evolution of nitrogen had ceased. The resulting solid product was collected and recrystallized from methanol to give trans - 2,4,6 - tribromo-N,N,N′,N′-tetramethylisophthalamide, tan prisms, M.P. 221–226° C.

Similarly cis - 5 - amino - 2,4,6-tribromo-N,N,N′,N′-tetramethylisophthalamide was converted to cis - 2,4,6-tribromo - N,N,N′,N′ - tetramethylisophthalamide, M.P. 217–222° C., colorless prisms from methanol.

EXAMPLE 6

Trans - 2,4,6 - trichloro-N,N,N′,N′-tetramethylisophthalamide [I; R and R′ are CH₃, R″ is H, X is Cl] was prepared by deamination of trans-5-amino-2,4,6-trichloro - N,N,N′,N′ - tetramethylisophthalamide according to the procedure of Example 5, and was obtained in the form of colorless prisms, M.P. 187–194° C. when recrystallized from ethyl acetate.

Similarly, cis - 5 - amino - 2,4,6 - trichloro-N,N,N′,N′-tetramethylisophthalamide was converted to cis - 2,4,6-trichloro - N,N,N′,N′-tetramethylisophthalamide, M.P. 171–190° C., colorless plates from ethyl acetate.

EXAMPLE 7

Cis - 2,4,6 - triiodo - N,N,N′,N′-tetramethylisophthalamide [I; R and R′ are CH₃, R″ is H, X is iodine] was prepared by deamination of cis - 5 - amino - 2,4,6-triiodo-N,N,N′,N′-tetramethylisophthalamide according to the procedure of Example 5, and was obtained in the form of fine yellow needles, M.P. 239–246° C. when recrystallized from ethanol.

Similarly, trans - 5 - amino-2,4,6-triiodo-N,N,N′,N′-tetramethylisophthalamide was converted to trans-2,4,6-triiodo-N,N,N′,N′-tetramethylisophthalamide, M.P. 240–247° C., pale yellow needles from isopropyl alcohol.

By similar procedures, 5 - amino - 2,4,6-tribromo-N,N,N′,N′-tetraethylisophthalamide, 5 - amino - 2,4,6-tribromo - N,N′ - dimethyl - N,N′ - diethylisophthalamide, 5 - amino - 2,4,6 - tribromo - N,N,N′,N′-tetraisopropylisophthalamide or 5 - amino - 2,4,6 - tribromo - N,N,N′,N′-tetrabutylisophthalamide can be converted, respectively, to the cis and trans isomers of 2,4,6-tribromo-N,N,N′,N′-tetraethylisophthalamide [I; R and R′ are C₂H₅, R″ is H, X is Br], 2,4,6 - tribromo - N,N′-dimethyl-N,N′-diethylisophthalamide [I; R is CH₃, R′ is C₂H₅, R″ is H, X is Br], 2,4,6 - tribromo - N,N,N′,N′-tetraisopropylisophthalamide [I; R and R′ are CH(CH₃)₂, R″ is H, X is Br], or 2,4,6 - tribromo - N,N,N′,N′-tetrabutylisophthalamide [I; R and R′ are C₄H₉, R″ is H, X is Br].

We claim:
1. A geometrical isomer of a compound of the formula

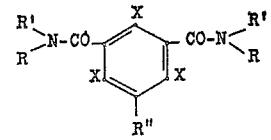

wherein X is chlorine, bromine or iodine, R and R′ are lower-alkyl, and R″ is hydrogen.

2. A compound according to claim 1 wherein R and R′ are methyl.

3. A geometrical isomer of 2,4,6-tribromo-N,N,N′,N′-tetramethylisophthalamide, according to claim 2 wherein X is bromine.

4. A geometrical isomer of 2,4,6-trichloro-N,N,N′,N′-tetramethylisophthalamide, according to claim 2 wherein X is chlorine.

References Cited
UNITED STATES PATENTS

| | | | |
|---|---|---|---|
| 3,337,624 | 8/1967 | Hoch | 260—558 |
| 3,170,955 | 2/1965 | Richards et al. | 260—558 |
| 2,937,203 | 5/1960 | Fuller | 260—558 |

FOREIGN PATENTS

| | | | |
|---|---|---|---|
| 820,661 | 9/1959 | Great Britain | 260—558 |

OTHER REFERENCES

Kay, Dissertation Abstracts, vol. 16, pp. 227–28 (1956), Chemical Abstracts, vol. 69, No. 86660 (Neth. Pat. 6613164).

Finar, Organic Chemistry, vol. 2, Stereochemistry and Chemistry of Natural Products, pp. 152–56 (1959).

HENRY R. JILES, Primary Examiner

H. I. MOATZ, Assistant Examiner

U.S. Cl. X.R.

260—293.76, 518 A; 424—324